United States Patent [19]
Vogel et al.

[11] Patent Number: 5,606,117
[45] Date of Patent: Feb. 25, 1997

[54] PRESSURE SENSOR FOR MEASURING PRESSURE IN AN INTERNAL COMBUSTION ENGINE

[75] Inventors: Manfred Vogel, Ditzingen-Heimberdingen; Werner Herden, Gerlingen; Jiri Marek, Reutlingen; Kurt Weiblen, Metzingen, all of Germany

[73] Assignee: Robert Bosch GmbH, Stuttgart, Germany

[21] Appl. No.: 358,147

[22] Filed: Dec. 16, 1994

Related U.S. Application Data

[63] Continuation-in-part of Ser. No. 191,004, Feb. 3, 1994, abandoned, which is a continuation-in-part of Ser. No. 927,650, Sep. 4, 1992, abandoned.

[30] Foreign Application Priority Data

Feb. 27, 1991 [DE] Germany .......................... 41 06 102.0

[51] Int. Cl.[6] .................................................. G01M 15/00
[52] U.S. Cl. ............................................................ 73/115
[58] Field of Search ........................... 73/115, 708, 714, 73/723, 725–727, 754, 1 B, 4 R

[56] References Cited

U.S. PATENT DOCUMENTS

| | | |
|---|---|---|
| 3,204,463 | 9/1965 | Taber . |
| 3,648,524 | 3/1972 | Dahle . |
| 4,333,349 | 6/1982 | Mallon et al. ............................. 73/708 |
| 4,576,052 | 3/1986 | Sugiyama ................................. 73/727 |
| 4,993,266 | 2/1991 | Omura et al. ............................. 73/720 |
| 5,365,768 | 11/1994 | Suzuki et al. ............................ 73/708 |

FOREIGN PATENT DOCUMENTS

| | | | |
|---|---|---|---|
| 0174927 | 7/1989 | Japan ..................................... | 73/754 |
| 2211659 | 7/1989 | United Kingdom . | |
| 2244335 | 11/1991 | United Kingdom . | |

Primary Examiner—Robert Raevis
Attorney, Agent, or Firm—Michael J. Striker

[57] ABSTRACT

The pressure sensor for a combustion chamber includes a housing; a membrane closing the housing on its combustion chamber side; a monocrystalline silicon chip inside the housing and including a sensor circuit device provided with a bridge circuit device including a piezoresistor producing an electrical signal in response to applied pressure and a plunger positioned between the membrane and the silicon chip to transmit a pressure in the combustion chamber to the piezoresistor. The bridge circuit device is connected to an amplifier circuit located on the silicon chip. The amplifier circuit includes amplifier resistors having resistance values determinative of the offset of the signal and sensor sensitivity. A network circuit for offset and sensitivity adjustments is provided on the silicon chip and includes four adjusting circuits for offset, sensor sensitivity, temperature compensation of offset and for temperature compensation of sensor sensitivity. Each adjusting circuit includes parallel-connected adjusting circuit branches each including an adjusting resistor and a semiconductor element in series. The adjusting circuit branches of respective adjusting circuits are connected in parallel with respective amplifier resistors. A logic circuit also provided on the silicon chip is used to make predetermined semiconductor elements electrically conductive so that predetermined adjusting circuit branches can be made conductive with a resistance determined by the adjusting resistors in the predetermined adjusting circuit branches to make the respective adjustments.

20 Claims, 3 Drawing Sheets

PRESSURE SENSOR FOR MEASURING PRESSURE IN AN INTERNAL COMBUSTION ENGINE

BACKGROUND OF THE INVENTION

The present application is a continuation-in-part application of U.S. patent application Ser. No. 08/191,004, now abandoned, which, in turn, is a continuation-in-part of U.S. patent application Ser. No. 07/927,650, filed Sep. 4, 1992, now abandoned.

The present invention relates to a pressure sensor device for measurement of pressure in a combustion chamber of an internal combustion engine.

A pressure sensor is described in German Published Patent Application DE-OS 31 25 640.6 in which the piezoresistive measuring elements, such as thick-film resistors of Cermet, conductive plastic, or metal, are mounted on a carrier. The resistor element and the carrier are arranged as close to the pressure chamber as possible to enable the prevailing pressure to be determined. Furthermore, the measuring signal is fed by electrical leads to an electronic evaluation circuit which is arranged outside the housing of the pressure sensor. This necessitates the elaborate connection of piezoresistive elements and of electronic components by screened leads. Since the piezoresistive measuring element is directly exposed to the pressure, it is also exposed to the high temperatures which prevail in the combustion chamber. The flames there propagate with a temperature of approximately 2000° C., which can result in warping of the housing, so that the pressure signal is incorrect due to the high temperatures.

U.S. Pat. No. 4,645,965 also describes a pressure sensor, the measuring element of which consists of a piezoelectric material. For the piezoelectric elements, it is possible to use, for example, piezoceramic elements, to which contact can be made by elaborate welding of wires with contact discs. In contrast to piezoresistive elements, a load, and hence a voltage, is produced in piezoelectric elements, because of the action of the pressure, which is the measuring signal. This voltage is tapped and evaluated. In contrast, piezoresistive elements have a voltage applied to them, and the electrical resistance in the piezoresistive element is changed by the pressure which acts on it.

SUMMARY OF THE INVENTION

Accordingly, it is an object of the present invention to provide a pressure sensor of the above-described type which avoids the above-described disadvantages of the prior art pressure sensors.

According to the invention the pressure sensor for measuring a pressure in a combustion chamber of an internal combustion engine comprises a housing having a combustion chamber side; a membrane closing the housing on the combustion chamber side; a monocrystalline silicon chip inside the housing, wherein the monocrystalline silicon chip includes sensor circuit means for measuring a pressure in the combustion chamber and the sensor circuit means comprises a bridge circuit device including at least one measuring element made of a piezoresistive material and at least one bridge circuit resistor connected to the at least one measuring element, the at least one measuring element producing an electrical signal in response to an applied pressure; a plunger positioned between the membrane and monocrystalline silicon chip to transmit the combustion chamber pressure to be determined to the at least one measuring element; amplifier means for amplifying the electrical signal from the at least one measuring element, the amplifier means being located on the monocrystalline silicon chip and the amplifier means including means for controlling an offset of the electrical signal and means for controlling sensor sensitivity; network circuit means on the silicon chip for adjusting the means for controlling the offset and the means for controlling the sensor sensitivity, wherein the network circuit means includes an adjusting circuit for adjusting the offset of the electrical signal, an adjusting circuit for adjusting the sensor sensitivity, an adjusting circuit for adjusting the temperature compensation of the offset and an adjusting circuit for adjusting the temperature compensation of the sensor sensitivity; and each adjusting circuit includes a plurality of adjusting circuit branches connected in parallel with each other and each and including an adjusting resistor and a semiconductor element connected electrically in series with each other; and logic means connected electrically with each adjusting circuit for making at least one predetermined semiconductor element electrically conductive so that at least one predetermined adjusting circuit branch can be made conductive with a resistance determined by the adjusting resistor in the at least one predetermined adjusting circuit branch made conductive.

The amplifier means includes a plurality of amplifier resistors having resistance values determinative of offset and sensor sensitivity and the adjusting circuit branches of respective adjusting circuits are advantageously connected in parallel with respective amplifier resistors. The logic means is advantageously located on the silicon chip with the sensor circuit means.

In some embodiments the bridge circuit device has one piezoresistor acting as the measuring element, while in other embodiments the bridge circuit device comprises four piezoresistors connected with each other in a Wheatstone bridge circuit acting as the measuring element.

The semiconductor elements are advantageously Zener diodes.

The monocrystalline silicon chip can advantageously also be provided with stabilized power supply circuit means for supplying the bridge circuit means with current or voltage.

In some embodiments more than one measuring element can be included in the Wheatstone bridge circuit and in other embodiments an intermediate element is provided between the plunger and the silicon chip for transmitting pressure from the plunger to the measuring element or elements on the silicon chip. The intermediate element can be another silicon chip having a mesa etching.

Advantageously the intermediate element can be with the silicon chip by a direct or an anodic bonding process.

The plunger can advantageously be made of a glass ceramic material and has an end portion bearing on the silicon chip made of a comparatively soft material.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
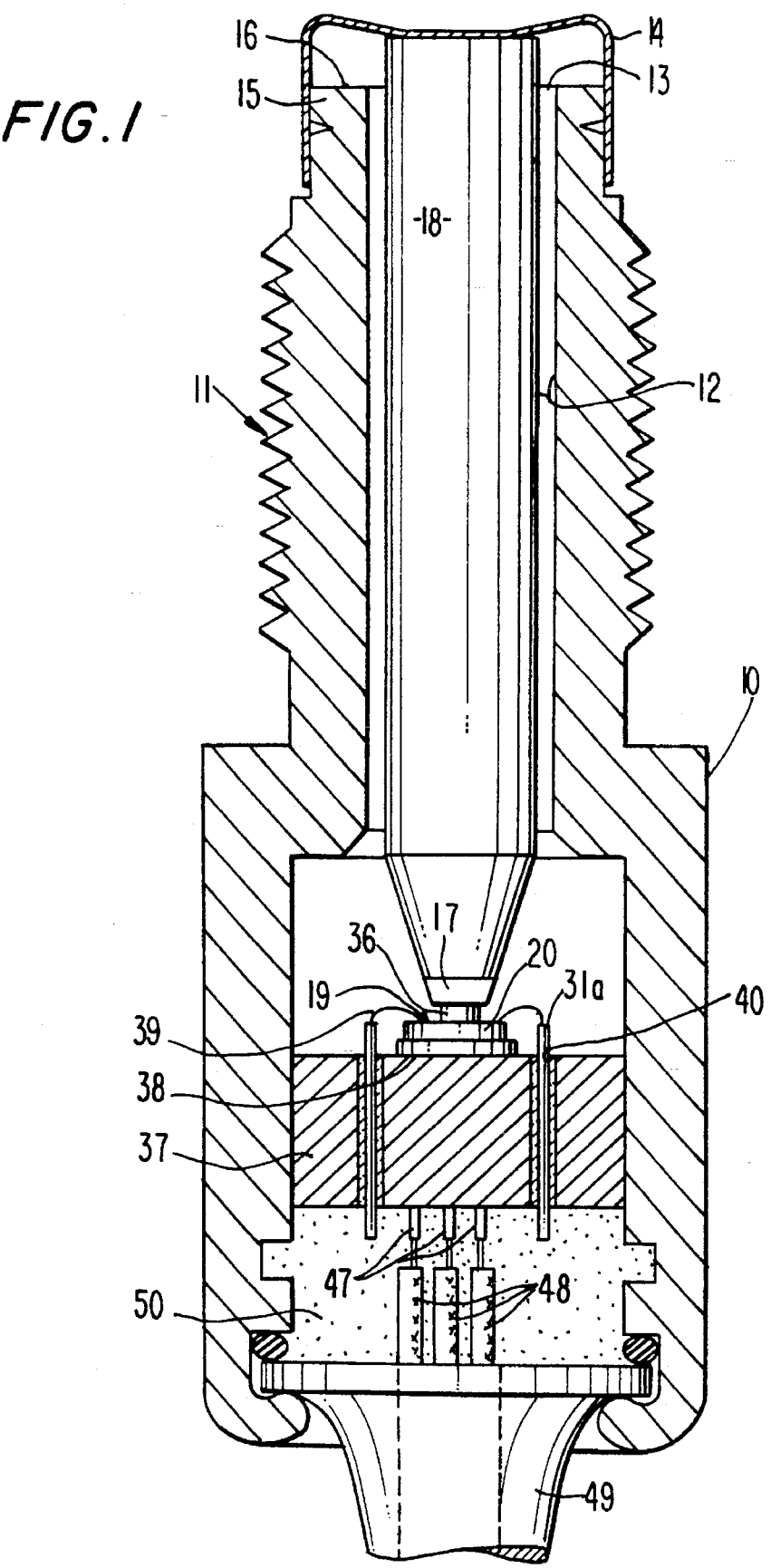
FIG. 1 is a longitudinal cross-sectional view through a pressure sensor according to the invention.

FIG. 1 shows one embodiment of a pressure sensor 11 for determining a pressure in the combustion chamber of an internal combustion engine. The pressure sensor 11 has a housing 10 provided with a central, throughgoing, stepped bore 12. The orifice 13 of the housing 10 which faces the combustion chamber is closed by a membrane 14. The membrane 14 is designed as a so-called cap membrane, in which the edge of the membrane is bent over and pushed over the end of the shaft 15 of the housing 10 and attached there by welding. The membrane 14 thus sits firmly on the housing 10, but to ensure the movability of the membrane 14, it does not directly contact the front face 16 of the shaft 15. The bending region of the membrane 14 can therefore move or flex freely. Alternatively, the membrane can be fixed in another way, for example by a snap-on closure on the shaft 15 of the housing 10. The membrane 14 is made of a superalloy, that is of an alloy of approximately 50% Ni, 20% Cr, 20% Fe, which is particularly advantageous. One end of a plunger 18 makes contact with a central region of the membrane 14, while the other end of the plunger bears on a piezoresistive measuring element 19 of a monocrystalline silicon (Si) chip 20. Piezoresistive measuring elements are elements which change their resistance value under the influence of pressure. The measuring element 19 consists of a piezoresistive resistor 21 which is manufactured by diffusion and other processes known from semiconductor technology and onto which the plunger 18 presses with an orthogonally directed force. In the above named semiconductor process, the silicon plate is doped with foreign atoms. Boron or phosphorus, for example, are used in practice. The measuring element 19 also has a second resistor 22 arranged in its immediate vicinity (FIG. 2) on the chip, onto which however no pressure acts.

Figure 2:
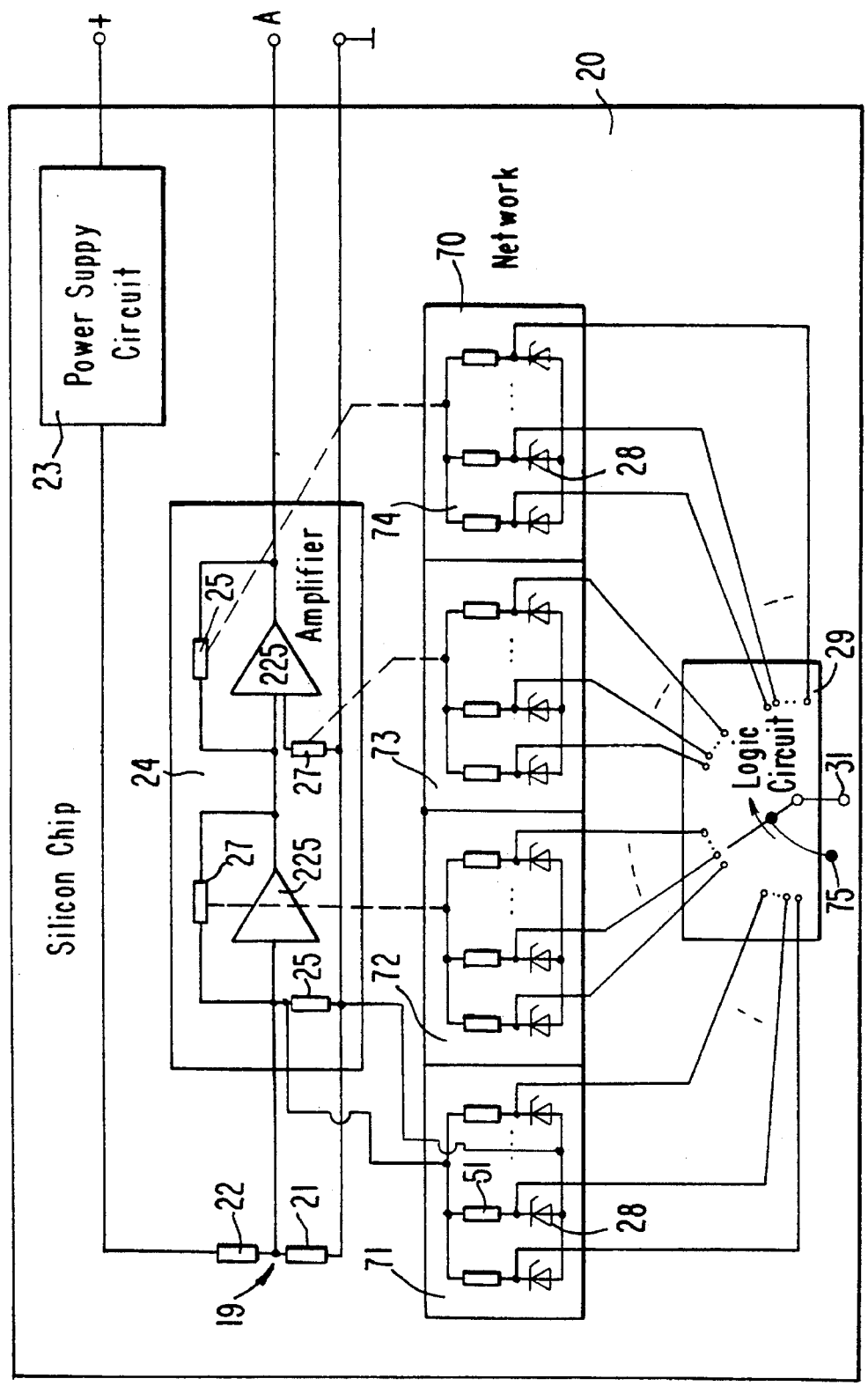
FIG. 2 is a diagrammatic representation of a sensor circuit according to the invention on a monocrystalline silicon chip in the housing of the pressure sensor of FIG. 1.

Like the resistor 21, this second resistor 22 is manufactured by one of the above-mentioned semiconductor processes. The resistor 22 complements the resistor 21 to form a so-called half-bridge circuit. In certain circumstances, two more resistors on which no pressure acts, four in total, may be present, so as to form a Wheatstone full bridge circuit. The silicon chip further accommodates a stabilized power supply circuit 23 for supply of the measuring element 19 with a constant and radio-screened voltage or current. A d.c. or a.c. amplifier circuit 24 further is coupled to the measuring half-bridge of resistors 21 and 22 to amplify the measured signal from the millivolt range to the volt range. In FIG. 2 the amplifier circuit is shown schematically. It consists of amplifier ICs 225 and amplifier resistors 27 for controlling the offset and sensitivity. Temperature dependent amplifier resistors 25 are arranged in the vicinity of the measuring bridge of the measuring element 19 to compensate the temperature dependence of the bridge resistors and of the piezo-coefficients of the piezoresistive elements used. The silicon chip carries a network circuit 70 containing up to four adjusting circuits 71 to 74. Each of these adjusting circuit 71 to 74 consists of parallel connected adjusting circuit branches each consisting of an adjusting resistor 51 connected in series with a Zener diode 28. Each of these adjusting circuits 71 to 74 is parallel connected across either an amplifier resistor 25 or an amplifier resistor 27. This connection is shown as an example in FIG. 2 between adjusting circuit 71 and amplifier and resistor 25 and is only shown schematically using dashed lines in the case of the additional adjusting circuits 72 to 74. The silicon chip further contains a well known multiplexing logical circuit means 29 that allows the external connector 31 to be switched to one of the Zener Diodes 28. The logic means 29 is drawn schematically in FIG. 2. The switch of the multiplexing logic means 29 can be controlled for selecting the Zener Diodes by a second external connection 75. Sufficiently high voltages or currents are applied to connector 31 to cause selected Zener Diodes 28 to become conductively and irreversibly alloyed as required and thus the required resistors 51 are effectively connected in parallel with the appropriate resistor 25 or 27 to modify the effective resistance at that point and perform the desired adjustment. This means that the adjusting resistors 51 in series connection with the alloyed Zener Diodes are connected parallel to each other and to the selected amplifier resistors 25 or 27. The four adjusting circuits 71 to 74 are designed to adjust up to four different parameters: offset, sensitivity, temperature dependence of offset and temperature dependence of sensitivity.

It is thereby possible, by applying a definite pressure to the measuring element 19, to balance both the offset and the sensitivity of the sensor, electrically, from the outside.

In appropriate circumstances, it will also be possible to influence the temperature dependence via the temperature dependent resistors 25. This type of bridge balancing and operational adjustment has been possible in previously known pressure sensors only by laser balancing of resistors on a thick-film hybrid. However, a thick-film circuit has a relatively large space requirement and thus contributes to the outer dimension of the sensor.

The network circuit 70 for adjusting sensor sensitivity and offset is arranged on the silicon chip 20. This network circuit 70 comprises the four adjusting circuits 71 to 74. Each adjusting circuit 71 to 74 is connected in parallel with one of the amplifier resistors 25 or 27. The individual adjusting circuit is used or adjusting of a certain circuit characteristics, for example the offset of the circuit, the sensitivity, the temperature dependence of the offset and the temperature dependence of the sensitivity, so that each item of the characteristic curve of the sensor is independently adjustable. This is possible since each adjusting circuit 71 to 74, as shown from FIG. 2, is connected to one of the resistors 25 or 27 in parallel and each adjusting circuit can be controlled individually. The balancing or adjustments is or are performed by making a predetermined number of the semiconductor element 28 conductively alloyed and thus connecting a predetermined number of network adjusting resistors 51 in parallel with the elements 25 or 27. For example Zener diodes can be used as the semiconductor elements 28.

The control of the individual adjusting circuits 71 to 74 of the network circuit 70 is performed with the help of a logic network 29. The logic means 29 comprises in a preferred embodiment a multiplexer which operates to select one of the Zener diodes 28 within one of the adjusting circuits 71 to 74.

In alternative embodiments not shown in the drawing each element of the network circuit 70 can have its own source of current from the outside of the housing and the logic means 29 need not be present.

Figure 3:
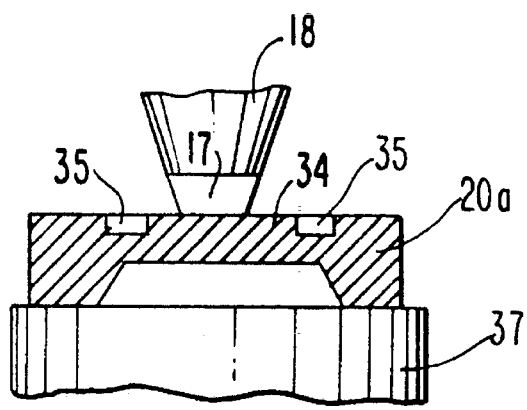
FIG. 3 is a detailed cutaway cross-sectional view of another embodiment of the pressure sensor according to the invention.

In the embodiment of the pressure sensor shown in FIG. 3, the measurement element comprises four resistors 35 structured in a thin area which is etched out of a silicon crystal 20a and which acts as a membrane 34. These four resistors 35 are connected together in a Wheatstone bridge circuit, with the force of the plunger 18 being applied to the center of the membrane 34, so that the resistors 35 thereby experience tensile stress and compressive strain in longitudinal or transverse direction. In other respects, the chip 20a is structured as shown in FIG. 2. The arrangement in accordance with FIG. 3 can be transferred analogously to FIG. 1, so that the plunger 18 engages in the center of the Wheatstone bridge circuit—without resting on the resistors—and the silicon chip 20 as shown in FIG. 1 has no etched-out membrane.

Figure 4:
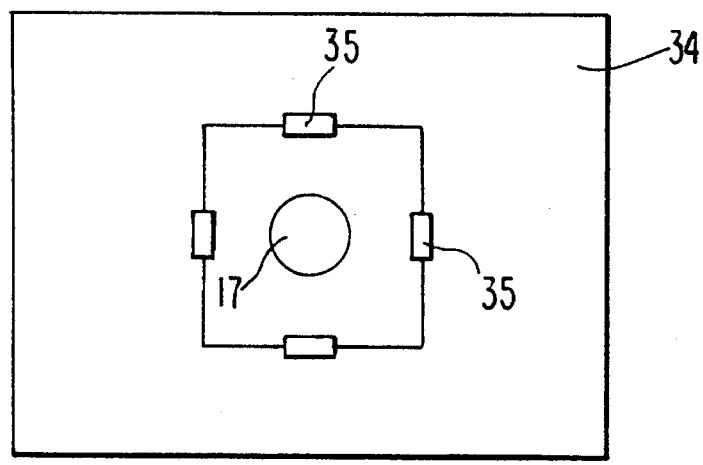
FIG. 4 is a diagrammatic top view of a portion of the pressure sensor shown in FIG. 3.
Figure 5:
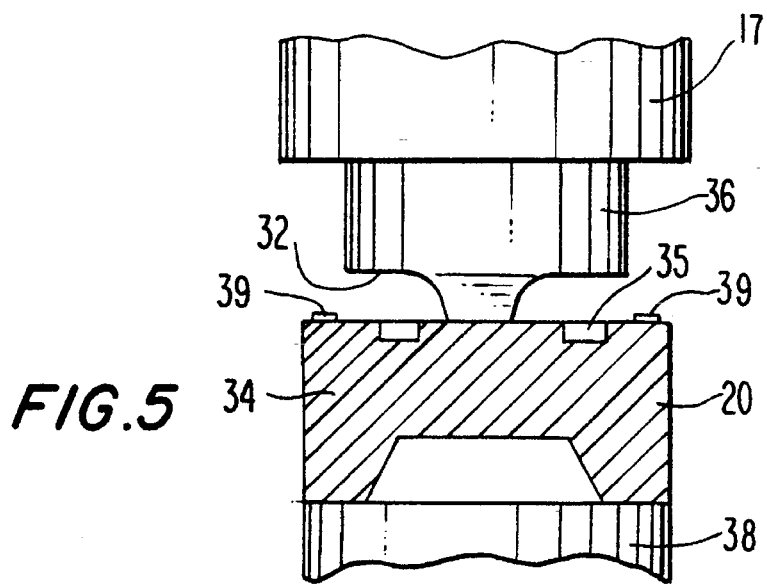
FIG. 5 is a cutaway cross-sectional view of an additional embodiment of the pressure sensor according to the invention.

The plunger 18 itself can be made of glass ceramics to ensure good heat insulation between the membrane and the measuring element 19, i.e. between the pressure chamber whose pressure is to be determined, and the measuring element 19. The end of the plunger 18 which faces the chip 20 can be conical so that its end has approximately the diameter of the sensitive resistor of the measuring element 19, or it can rest centrally on a membrane 34 or in the center of the Wheatstone bridge circuit. This makes it possible to guide the plunger 18 in the bore 12, but limiting it in the region of the pressure transmission to the size of the measuring element 19. To ensure a definite force transfer from the plunger 18 to the measuring element 19, the plunger 18 is manufactured, at least in its end region 17, from a relatively soft material. This eliminates the possibility of surface roughnesses of the plunger end introducing measurement errors in the measuring resistor 21 of the measuring element 19, by virtue of the fact that positive contact is achieved between the front face of the plunger end and the surface of the measuring element 19. As shown in FIG. 5 an intermediate element 36 can be arranged to bear on the chip 20. This is used to apply the force of the plunger 18 most homogeneously and with an accurately defined bearing surface onto the measuring element 19 without destroying the measuring element 19 by a rough and uneven surface of the plunger end or inducing additional transverse tensions in the measuring element 19. The intermediate element 36 can advantageously be made of borosilicate glass or of silicon, since these materials are matched to the Si chip in the heat expansion coefficient and have a high surface quality. The borosilicate glass material to be employed may be the Pyrex material made by Corning-Glass Works in the U.S. or the Tempax material made by the Schott company in Mainz (DE). The intermediate element 36 can have a so-called hump or mesa structure 32 as shown in FIG. 4. In a mesa structure, there are no longer any even surfaces, but rises and/or depressions. Even in the manufacturing process, the wafer with the Si chips can be anodically or directly bonded to the etched Pyrex or Si wafer in mesa structure, i.e. mechanically connected and then sawn. This provides for a particularly high setting accuracy of the intermediate element 36.

Alternatively, it would be feasible to manufacture the entire plunger 18 from a soft material, but this would negatively influence the stiffness of the plunger 18. When selecting the material for the plunger, it should be taken into consideration that the plunger should have as low a heat conductivity as possible, so that the measuring signals are not erroneous because of temperature fluctuations or influenced by the temperature itself. Glass ceramics, for example, have a low heat conductivity. The material used for the region 17 of the plunger 18 can be a relatively soft material, aluminium, brass, copper, or plastics, for example. The material for the soft region does not have to be matched to the low heat conductivity.

The chip 20 either rests directly against an abutment 37 which is pressed into the bore 12, or it is connected to the same via a carrier 38. The carrier 38 should avoid the effects of different expansion coefficients between the silicon chip 20 and the abutment 37. A most suitable carrier material is Si or borosilicate glass. As seen in FIG. 1 the abutment 37 has several throughgoing straight bores 40, which have axes approximately parallel with the bore 12 and in which the balancing pins 31a and the pins 47 for the electrical connections are guided. The pins 31a and 47 are connected to the Si chip 20 via bonding wires 39. The leads 48 of the pins 47 are gathered together in a nozzle 49. For protection from damaging environmental influences, such as humidity, the bore can be filled with a sealing compound 50 in the vicinity of the pins and of the electrical circuits.

While the invention has been illustrated and described as embodied in a pressure sensor for pressure measurement in an combustion chamber of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A pressure sensor for a combustion chamber of an internal combustion engine, said pressure sensor comprising:

a housing having a side facing the combustion chamber;

a membrane closing said housing on said side facing said combustion chamber;

a monocrystalline silicon chip inside said housing, wherein said monocrystalline silicon chip includes sensor circuit means for measuring a pressure in said combustion chamber and said sensor circuit means comprises a bridge circuit device including at least one measuring element made of a piezoresistive material and at least one bridge circuit resistor connected to said at least one measuring element, said at least one measuring element having means for producing an electrical signal in response to an applied pressure;

a plunger positioned between said membrane and said monocrystalline silicon chip to transmit said combustion chamber pressure to be determined to said at least one measuring element;

amplifier means for amplifying said electrical signal from said at least one measuring element, said amplifier means being located on said monocrystalline silicon chip and said amplifier means including means for controlling an offset of said electrical signal and means for controlling sensor sensitivity;

network circuit means for adjusting said means for controlling the offset and said means for controlling the sensor sensitivity, wherein said network circuit means is located on said monocrystalline silicon chip and includes an adjusting circuit for adjusting the offset of the electrical signal, an adjusting circuit for adjusting the sensor sensitivity, an adjusting circuit for adjusting the temperature compensation of the offset and an adjusting circuit for adjusting the temperature compensation of the sensor sensitivity; and each of said adjusting circuits includes a plurality of adjusting circuit branches connected in parallel with each other, each of said adjusting circuit branches including an adjusting resistor and a semiconductor element connected electrically in series with each other; and logic means connected electrically with each of said adjusting circuits for making at least one predetermined one of said semiconductor elements electrically conductive so that at least one predetermined one of said adjusting circuit branches can be made conductive with a resistance determined by said adjusting resistor in said at least one predetermined adjusting circuit branch made conductive thereby.

2. The pressure sensor as defined in claim 1, wherein each of said semiconductor elements is a Zener diode.

3. The pressure sensor as defined in claim 1, wherein said logic means for making said predetermined adjusting circuit branches conductive is located on said monocrystalline silicon chip.

4. The pressure sensor as defined in claim 1, further comprising stabilized power supply circuit means for supplying said sensor circuit means with current and voltage, said stabilized power supply circuit means being located on said monocrystalline silicon chip.

5. The pressure sensor as defined in claim 1, wherein said monocrystalline silicon chip has a membrane therein, said membrane in said silicon chip being etched out of said silicon chip, and said plunger bears on said monocrystalline silicon chip approximately in a center region of said membrane and said at least one measuring element is structured in said membrane in said silicon chip.

6. The pressure sensor as defined in claim 1, further comprising an intermediate element between said plunger and said silicon chip for transmitting said pressure from said plunger to said at least one measuring element.

7. The pressure sensor as defined in claim 6, wherein said intermediate element comprises another silicon chip.

8. The pressure sensor as defined in claim 6, wherein said intermediate element is connected with said monocrystalline silicon chip by an anodic bonding process.

9. The pressure sensor as defined in claim 6, wherein said intermediate element is connected with said monocrystalline silicon chip by a direct bonding process.

10. The pressure sensor as defined in claim 6, wherein said intermediate element has a mesa etching.

11. The pressure sensor as defined in claim 1, wherein said plunger is made from a glass ceramic material.

12. The pressure sensor as defined in claim 1, wherein said amplifier means includes a plurality of amplifier resistors having resistance values determinative of said offset and said sensor sensitivity and said adjusting circuit branches of respective adjusting circuits are connected in parallel with respective ones of said amplifier resistors.

13. A pressure sensor for a combustion chamber of an internal combustion engine, said pressure sensor comprising:

a housing having a side facing the combustion chamber;

a membrane closing said housing on said side facing said combustion chamber;

a monocrystalline silicon chip inside said housing, wherein said monocrystalline silicon chip includes sensor circuit means for measuring a pressure in said combustion chamber and said sensor circuit means comprises a bridge circuit device including at least one measuring element made of a piezoresistive material and at least one bridge circuit resistor connected to said at least one measuring element, said at least one measuring element having means for producing an electrical signal in response to an applied pressure;

a plunger positioned between said membrane and said monocrystalline silicon chip to transmit said combustion chamber pressure to be determined to said at least one measuring element;

amplifier means for amplifying said electrical signal from said at least one measuring element, said amplifier means being located on said monocrystalline silicon chip and said amplifier means including means for controlling an offset of said electrical signal and means for controlling sensor sensitivity including a plurality of amplifier resistors having resistance values determinative of said offset and said sensor sensitivity;

network circuit means for adjusting said means for controlling the offset and said means for controlling the sensor sensitivity, wherein said network circuit means is located on said monocrystalline silicon chip and includes an adjusting circuit for adjusting the offset of the electrical signal, an adjusting circuit for adjusting the sensor sensitivity, an adjusting circuit for adjusting the temperature compensation of the offset and an adjusting circuit for adjusting the temperature compensation of the sensor sensitivity; and each of said adjusting circuits includes a plurality of adjusting circuit branches connected in parallel with each other, each of said adjusting circuit branches including an adjusting resistor and a semiconductor element connected electrically in series with each other; and logic means connected electrically with each of said adjusting circuits for making at least one predetermined one of said semiconductor elements electrically conductive so that at least one predetermined one of said adjusting circuit branches can be made conductive with a resistance determined by said adjusting resistor in said at least one predetermined adjusting circuit branch, said logic means being located on said monocrystalline silicon chip.

14. The pressure sensor as defined in claim 13, wherein each of said semiconductor elements is a Zener diode.

15. The pressure sensor as defined in claim 13, further comprising stabilized power supply circuit means for supplying said sensor circuit means with current and voltage, said stabilized power supply circuit means being located on said monocrystalline silicon chip.

16. The pressure sensor as defined in claim 13, further comprising an intermediate element between said plunger and said silicon chip for transmitting said pressure from said plunger to said at least one measuring element.

17. The pressure sensor as defined in claim 16, wherein said intermediate element comprises another silicon chip.

18. The pressure sensor as defined in claim 13, wherein said plunger is made from a glass ceramic material.

19. The pressure sensor as defined in claim 13, wherein said bridge circuit device comprises a piezoresistor acting as said at least one measuring element.

20. The pressure sensor as defined in claim 13, wherein said bridge circuit device comprises four piezoresistors connected with each other in a Wheatstone bridge circuit acting as said at least one measuring element.

* * * * *